United States Patent [19]

Babunovic

[11] 4,012,323

[45] Mar. 15, 1977

[54] SEPARATOR APPARATUS

[75] Inventor: Momir Babunovic, Des Peres, Mo.

[73] Assignee: Barry-Wehmiller Company, St. Louis, Mo.

[22] Filed: Aug. 18, 1975

[21] Appl. No.: 605,724

[52] U.S. Cl. .............................. 210/232; 209/398; 209/407; 210/415

[51] Int. Cl.[2] ....................................... B01D 25/08

[58] Field of Search .................. 209/398, 407, 408; 210/407, 408, 413, 414, 415, 232; 220/320; 292/256.67

[56] References Cited

UNITED STATES PATENTS

| 506,928 | 10/1893 | Newman | 292/256.67 |
|---|---|---|---|
| 2,409,292 | 10/1946 | MacGregor | 209/398 X |
| 2,526,238 | 10/1950 | Kemdall | 292/256.67 |
| 3,322,283 | 5/1967 | Babunovic et al. | 210/415 X |
| 3,664,501 | 5/1972 | Cowan | 209/407 |

FOREIGN PATENTS OR APPLICATIONS

| 252,334 | 7/1911 | Germany | 209/407 |
|---|---|---|---|
| 50,826 | 5/1932 | Norway | 209/407 |

Primary Examiner—Frank A. Spear, Jr.
Assistant Examiner—R. G. Mukal
Attorney, Agent, or Firm—Gravely, Lieder & Woodruff

[57] ABSTRACT

Separator apparatus for separating out the insolubles and pulpy material from a container washing solution in a rotary screw separator apparatus which is provided with means to extend the useful life of the apparatus and maintain efficient separation by adjustment of the separator screen to restore as nearly as possible the original working clearance of the screen about the rotary screw.

1 Claim, 5 Drawing Figures

SEPARATOR APPARATUS

BACKGROUND OF THE INVENTION

This invention relates to improvements in separator apparatus handling fluids which carry solids and pulpy materials.

The improved apparatus to be described with particular reference to handling caustic washing fluids commonly used in container washing machines is also useful for handling a variety of fluids containing solids or semi-solids that must be separated out so that the fluid may be relieved of such foreign materials rapidly and as nearly completely as possible. Thus, the separator apparatus may have many uses in industrial systems where separation of solids, semi-solids, and the like have to be separated from fluids which are contaminated thereby so that the fluids may be cleaned prior to re-use or for other purposes.

In container washing machines the washing fluid is usually a caustic solution which is used to remove labels adhesively applied to the containers, as well as to dislodge foreign materials from the interior. The caustic solution is generally recirculated in the washing machine so that it may be reused many times for economy of operation. In order for the caustic washing to do a good job and clean the containers it must be substantially freed of solids, semi-solids, and materials reduced to a pulpy condition before being recirculated to the washer machine. If the separation of the solids and other foreign materials is not satisfactorily accomplished, the recirculated fluid carries the same back into the washer where it can again contaminate the containers. This is an undesirable condition, so that an object of the invention is to provide separator apparatus which will effectively perform the separation function in an improved and efficient manner.

An important object of this invention is to provide separator apparatus for extracting insolubles and pulpy material from the washing solution used in container washing machines, wherein the apparatus includes a lifting device operably mounted within a perforated tubular separator screen with an initial desired operating clearance, and means to maintain efficient operation of the apparatus by restoring the clearance to substantially the initial clearance so as to accommodate wear, extend the useful life of normally expensive components, and avoid a reduction in the effectiveness of separating the unwanted material from the washing solution.

The invention consists in the parts, components, and arrangement of parts and components, hereinafter shown and described in relation to a presently preferred embodiment.

DETAILED DESCRIPTION OF THE APPARATUS

Figure 1:
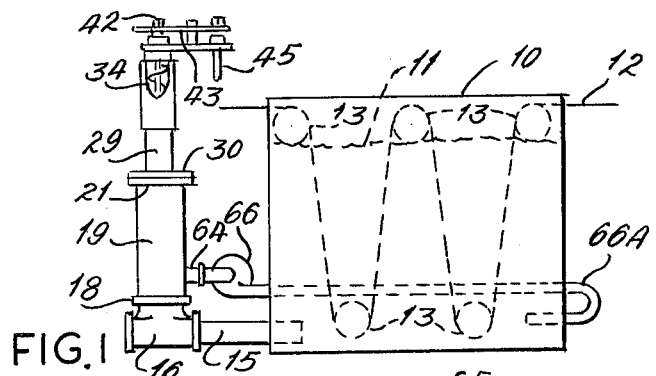
FIG. 1 is a schematic view of the present apparatus in its operating relation to a container washing machine.

Referring now to FIG. 1, it can be seen that the system includes a schematic view of a container washer tank 10 which contains a washing fluid up to the level 11 as indicated. A conveyor 12 of any suitable type is trained over a series of wheels 13 so that containers to be washed are carried downwardly and upwardly several times in the washing solution before being discharged from the tank 10. The washing fluid is usually a caustic solution of a strength suitable for dissolving the adhesive materials used to secure labels, as well as for removing foreign materials and debris which may have collected internally of the bottles. Unless there is some apparatus for separating the labels and foreign materials of a non-soluble character from the caustic solution, such solution will very quickly become contaminated and lose its effectiveness. On the other hand, by rapidly and substantially completely removing labels and foreign material from the washing solution it is possible to reuse the washing fluid many times before it becomes excessively contaminated with soluble foreign materials, such as the label adhesive materials.

Figure 2:
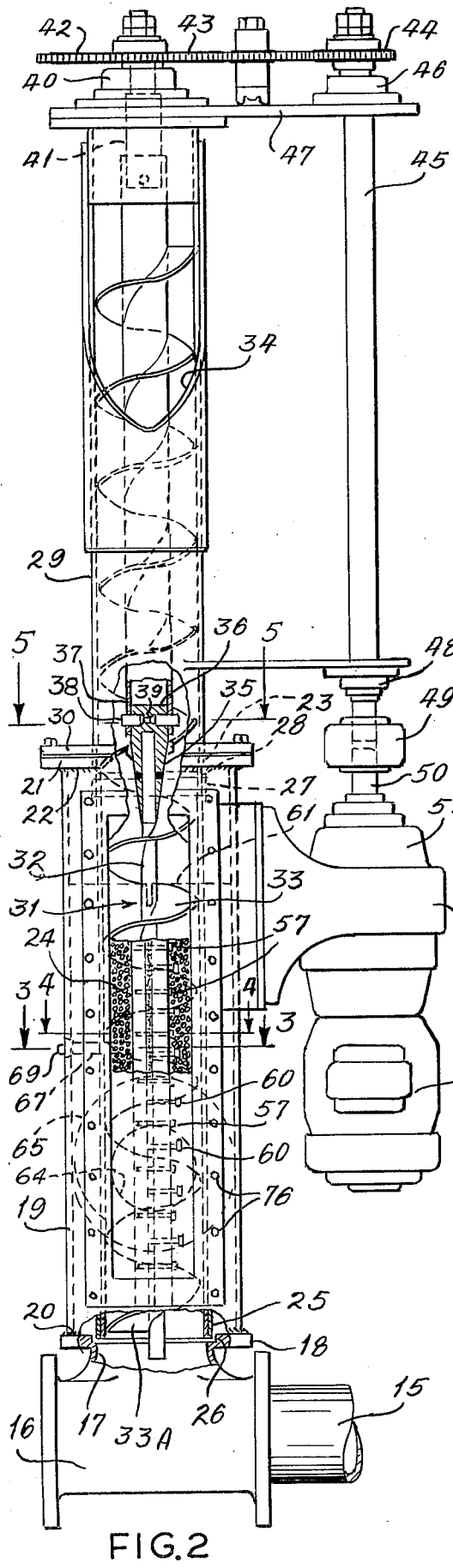
FIG. 2 is an enlarged and partially sectioned elevational view of the preferred separator apparatus.
Figure 3:
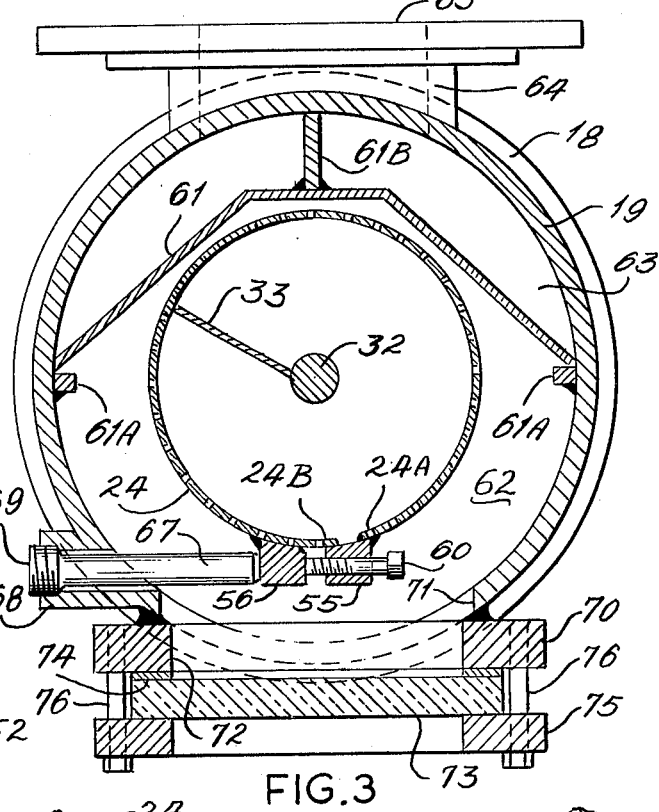
FIG. 3 is a section view taken along the line 3—3 in FIG. 2.
Figure 4:
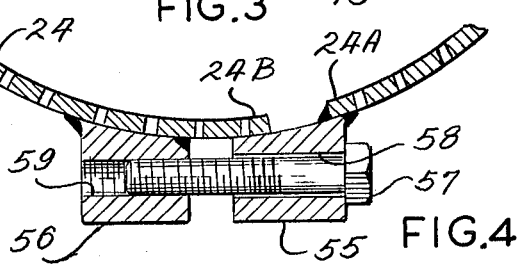
FIG. 4 is a fragmentary sectional view taken along the line 4—4 in FIG. 2.
Figure 5:
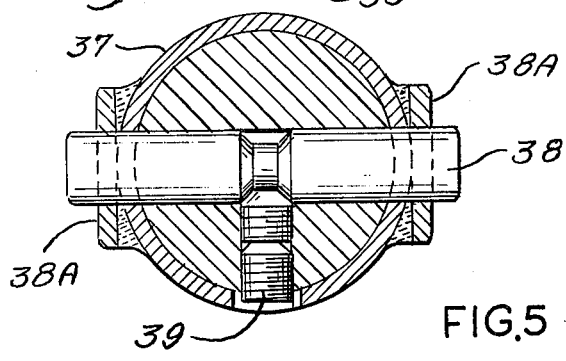
FIG. 5 is a sectional view taken along the line 5—5 in FIG. 2.

Turning now to the enlarged and partly sectional view of FIG. 2, and where appropriate to FIGS. 3, 4 and 5, the presently preferred separator apparatus is provided with a bottom T fitting 16 which is connected at one side to the washer by a feed pipe 15. The outlet 17 of the T fitting 16 is surrounded by a flange 18 which provides the bottom support for a casing 19 which is welded thereto at 20 so as to form a fluid type connection. The upper end of the casing is connected to a flange 21, also by welding at 22 to form a fluid type connection, and this flange is provided with an aperture 23 for a purpose to be described presently. The casing 19 encloses a tubular perforated screen 24 having a bottom end provided with a reinforcing ring 25 such that the ring 25 seats in a recess 26 in the flange 18 of the fitting 16. The upper end of the perforated screen 24 is also provided with a reinforcing ring 27, but at this end the screen projects above the reinforcing ring 27 so as to provide a centering lip 28 to receive the bottom end of the discharge conduit 29. The discharge conduit 29 is provided with an attaching flange 30 which is secured in any suitable manner to the upper flange 21 on the casing 19 for the purpose of establishing a fluid tight connection.

The perforated screen 24 encloses a screw conveyor member 31 which is made up of a solid shaft 32 which supports helical flights 33. The flights 33 extend from the bottom flight 33A through the meeting junction of flanges 21 and 30, and continue upwardly in the discharge conduit 29 to a side discharge opening 34 which is near the upper end of the conduit 29. As the screw conveyor passes through the upper end of the casing 19 the shaft 32 is secured to an adapter 35. The adapter has an enlarged end 36 which is fitted into the lower end of a tubular shaft 37 and is secured by a shear pin 38 held in position by a set screw 29 (FIG. 5). The tubular shaft 37 is reinforced at the shear pin location by bearing elements 38A. The tubular shaft 37 extends upwardly in the discharge conduit and is supported in a thrust bearing assembly 40 by means of a shaft extension 41 which is connected to a sprocket 42 for the purpose of rotating the tubular shaft 37, and through the adapter 35, rotating the shaft 32 in the casing 19. The bearing 40 at the upper end of the discharge conduit 29 supports the entire screw conveyor 31, while the screen 24 is given a predetermined clearance between its internal surface and the margins or edges of the flights 33, whereby it acts to guide the conveyor at the lower end of the shaft 32.

The sprocket 42 is suitably connected by a drive chain 43 to a sprocket 44 which is fitted on a driveshaft 45 carried in a bearing 46 on support 47. The shaft 45 extends downwardly through a suitable bearing 48 to a flexible coupling 49 where it is connected to shaft 50 which is the output of a suitable drive gear assembly in casing 51. Casing 51 is supported in a bracket 52 to the side of casing 19, and a drive motor 53 depends from the gear casing 51.

It is seen in FIG. 3 that the perforated screen 24, which starts as a perforated flat sheet, is roll formed with a longitudinal gap between the margins 24A and 24B. One margin 24A of the screen is secured by welding to an elongated bar 55 which extends outwardly widthwise so as to be lapped by the other margin 24B. A second bar 56 is secured to the screen along its length and is spaced back from the margin 24B so as not to prevent the latter margin from engaging the adjacent surface of the bar 55. It can be seen in FIGS. 2 and 4 that there are a plurality of tightening bolts 57 which slide through apertures 58 in the bar 55 and engage in threaded apertures 59 in the bar 56. There are a sufficient number of bolts 57 spaced along the length of the screen so as to maintain proper orientation of the screen margins 24A and 24B to avoid developing unequal circumferential wrap about the screw flights 33 along the length of the screen 24.

It is particularly shown in FIG. 2 that the tightening bolts 57 alternate with a second series of jack bolts 60 which are threadedly carried (FIG. 3) in the bar 55 so that the ends thereof will project into abutment with the bar 56. The jack bolts 60 are provided to assure the proper circumferential positioning of the perforated screen 24 around the helical flights 33, whereby a predetermined desired clearance can be initially established, as well as restored from time to time as wear occurs. The material used in the construction of the helical screw conveyor 31 and the perforated screen 24 is such that prolonged useful life is desirable.

The perforated screen 24 must not be permitted to rotate with the screw conveyor 31, otherwise the tightening and jack bolts 59 and 60 respectively would move to a position against an internal baffle member 61 which divides the interior of the casing 19 into a first compartment 62 where the washing solution is first collected, and into a second compartment 63 where the washing solution is received for passage through an outlet 64 which is provided with attachment flange 65. The flange 65 furnishes the means for connecting the outlet 64 to the suction side of a suitale centrifugal pump 66 which returns the cleaned washing solution by conduit 66A to the washing tank 10. Prevention of rotation of the screen 24 is obtained by inserting a stop pin 67 through a suitable orifice 68 in the side wall of the casing 19, and the outer end of the stop pin 67 is connected to a plug 69 which forms a fluid seal in the orifice 68. The stop pin 67 is best seen in FIG. 3, and it is located along the length of casing 19 seen in FIG. 2.

In order to be able to adjust the clearance of the screen 24 relative to the flights 33 of the screw conveyor 31, the casing 19 is provided with a longitudinal extending window frame 70 which is suitably secured and sealed over a side opening 71 (FIG. 3) in the casing 19. The frame defines the limits of an elongated access opening 72 which is aligned with the casing opening 71 over the normal position of the tightening bolts 57 and jack bolts 60 for easy access thereto. A viewing glass 73 is mounted over the opening 72 and is sealed thereto by a gasket 74, and these two components are secured in position by a retainer frame 75 having a suitable number of bolts 76.

The operation of the present apparatus can best be understood in connection with FIGS. 1, 2 and 3 where it is seen that upon operation of motor 53 the screw conveyor 31 will be operated to lift the insoluble and pulpy materials admitted into the fitting 16 through the perforated screen 24 and the discharge conduit 29 for discharge at the opening 34. During the operation of the conveyor 31 the washing fluid is permitted to drain through the preferred screen 24 into the receiving chamber 62 and as the level of the fluid rises in this chamber 62 it flows over the upper end of the baffle 61 and into chamber 63. The baffle 61 is retained in the operative position by suitable lugs 61A secured to the inner surface of casing 19 and by alignment ribs 61B which are positioned at the upper and lower ends of the baffle 61 and are of relatively short length. The washing solution is sucked out of the casing 19 through the outlet 64 by the action of the pump 66, while the insoluble and pulpy material, including such objects as broken glass, is carried upwardly and expelled through the discharge opening 34.

It can be seen from the foregoing detailed description that the present apparatus will provide for extended life and efficient use of the operating components, and these advantages are achieved by a relatively simple arrangement of parts which can be readily reached for adjustment without requiring major disassembly. The present apparatus is a unique improvement over apparatus previously provided to perform the same or similar function and it is the intention to include reasonable variations from the structure herein disclosed.

What is claimed is:

1. In separator apparatus, for extracting insolubles and pulpy material from a fluid carrier medium, having a casing providing an inlet for the fluid carrier medium burdened with insolubles and pulpy material and an outlet for the insolubles and pulpy material substantially free of the fluid carrier medium; a perforated screen member extending between the inlet and outlet to divide the casing into an inner space inside said screen member and an outer space between said screen member and the interior of said casing; other outlet means in said casing for the fluid carrier medium substantially free of insolubles and pulpy material; elongated baffle means in said casing between said screen and said other outlet means for maintaining said screen member submerged in fluid carrier medium to the extent of the elongation of said baffle means; and a rotary conveying member in said screen member and extending from said inlet to said outlet to lift the insolubles and pulpy material to said outlet while the fluid carrier medium flows through said perforated screen member to said outer space; the improvement of said perforated screen member being split longitudinally to wrap about said rotary conveying member and form margins at the split; first means secured to and extending along one margin of said screen member and adjustably overlapping the other margin to close the space at the split and prevent leakage; second means carried by and extending along said other margin of said screen member; adjustment elements spaced along the length of and engaging said first and second means to change the spacing therebetween and vary the wrap of said split screen member about said rotary conveying member to compensate for wear of said rotary conveying member; and means in said casing forming an access opening to the interior for exposing said perforated screen member at the location of said adjustable means, said access opening means normally making said casing fluid tight.

* * * * *

UNITED STATES PATENT OFFICE
CERTIFICATE OF CORRECTION

Patent No. 4,012,323　　　　　　　　　Dated March 15, 1977

Inventor(s) Momir Babunovic

It is certified that error appears in the above-identified patent and that said Letters Patent are hereby corrected as shown below:

Column 3, line 54, the word "suitale" should read "suitable".

Signed and Sealed this

Twenty-first Day of June 1977

[SEAL]

Attest:

RUTH C. MASON　　　　　　　　　　C. MARSHALL DANN
Attesting Officer　　　　　　Commissioner of Patents and Trademarks